Patented Sept. 10, 1935

2,014,167

UNITED STATES PATENT OFFICE 2,014,167

ADHESIVE AND PROCESS OF MAKING SAME

Albert Henry Bowen, Seattle, Wash., assignor to I. F. Laucks, Inc., Seattle, Wash., a corporation of Washington No Drawing. Application April 4, 1933, Serial No. 664,445

28 Claims. (Cl. 134—23.8)

The present invention relates to improvements in adhesives suitable for use for bonding materials of widely different physical and chemical properties. More particularly my invention is concerned with the production of glue bases from proteinous substances by combination of such substances with zinc chloride and the subsequent treatment of said glue bases to produce water resistant adhesives. It has been heretofore known that water resistant adhesives may be derived from proteinous substances by the use of alkaline dispersing agents and a subsequent addition of water resistance producing agents thereto. I have discovered a method whereby proteinous substances may be combined with zinc chloride resulting in the production of new glue bases, which glue bases may be made water resistant by treatment with suitable water resistance producing agents. The final products of this process are suitable for use as glues or adhesives for wood, for cloth, for paper and for other materials and combinations thereof.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

For the purposes of this disclosure the term "proteinous substance" includes such materials as ground seed meals or flours, more particularly described as the protein containing material which results from the grinding of the residue of oilseeds from which the oil content has been removed in whole or in part; vegetable protein in various stages of purification, such as peanut protein, soya bean protein, wheat gluten, etc.; the casein of milk; so-called animal glue from hides, bones, etc.; dried blood albumen, egg albumen and such like materials, and combinations thereof. The reaction products of all of these proteinous substances with zinc chloride have been used by me in the manufacture of adhesives according to my process. The following examples illustrate my discovery:

Example 1.—50 parts of peanut flour are added to 110 parts of water and the mixture thoroughly stirred. To this is added 50 parts of zinc chloride with continued stirring. A rise of temperature due to heat of reaction will be noted. External heat may be applied to hasten the completion of the reaction, which is evidenced by smoothness and uniform density. This material is extremely viscous and tacky, but is non-drying. It is not dissolved by water, but upon contact with an excess of water it is precipitated, as a flocculent mass. When a non-drying and very tacky glue is required, as in certain applications of linoleum, and the like, this glue has distinct advantage, as it is quickly prepared from cheap materials and keeps indefinitely. It has the property of recovering its strength when wetted and again dried.

However, for most uses I prefer to use this material as a base, modifying it further by the following procedure, which imparts drying properties and greatly increased water resistance.

Example 1—A.—To 40 parts of the product of Example 1 add 10 parts of urea, 10 parts of ethyl alcohol, 15 parts of 37% formalin. The formalin may also be successfully used without the urea, but in that case the life of the adhesive is considerably shortened. By life I mean the period of time during which the adhesive remains of spreadable consistency and retains its adhesive strength.

Many materials have been bonded successfully with this highly water resistant adhesive, such as wood veneers, wood blocks, paper to metal, wood to metal, cloth to metal, cloth to wood, cloth to plaster, etc. The product of Example 1—A may be thinned if desired by the use of methyl or ethyl alcohol, butyl alcohol, etc. Instead of urea in the Example 1—A other substances may be added which act as diluents and at the same time extend the life of the products. Substances which I have used successfully are methyl alcohol, ethyl alcohol, ethyleneglycolmonobutyl ether (butyl cellosolve), cyclohexanone, acetic acid, lactic acid, etc.

To illustrate a method of producing an adhesive having a life of many months but somewhat lower water resistance than the product of 1—A the following procedure may be given.

Example 1—B.—Add to the product of Example 1 45 parts of urea and 9 parts of formalin. The formalin may be successfully used without the urea, but the life of the adhesive is much greater when the urea is used.

The water resistance of the product of Example 1—B may be greatly increased by heating the glued articles to a temperature of from 100 to 200° F. for a short period.

Example 2.—To 500 parts of powdered casein are added 800 parts of water. The mixture is permitted to soak 10 minutes with some stirring, then 500 parts of solid zinc chloride are added and stirring continued. Heat of reaction is developed which may be augmented by external heat to complete the reaction. The reaction is complete when all individual particles have disappeared and the mixture becomes more or less transparent. This mixture when cold is very thick, but when warmed becomes fluid and easily spread. It has been kept for many months without any deterioration. It may be thinned if necessary with methyl or ethyl alcohol. This new product has the properties of the new product of Example 1 and may be used for the same purposes. It is particularly useful as a glue base, subsequent treatment of which results in the production of highly water resistant adhesives having excellent working properties and long life. These new products in the wet form have toughness and tenacity in the cold but soften or liquefy easily. They show no perceptible physical or chemical change with time. They are soluble in ammonia but not in other alkalies. They are thinned by additions of alcohol, urea, and other solvents which are miscible with water. Formaldehyde and equivalents cause the products to gel. Addition of water to the products in the wet form causes precipitation.

Example 2—A.—Take 40 parts of the product of Example 2, add 10 parts by weight of butyl alcohol and 15 parts by weight of 37% formalin. The product of this example is an extremely adhesive glue, which dries to a very hard and tough bond.

Example 2—B.—It is a peculiar property of the products resulting from my process that further addition of water thereto causes separation of a flocculent precipitate. Take for instance the product of Example 2, add water thereto and a flocculent precipitate will result which may be separated and dried. This dried precipitate may be ground and used as a dry glue for bonding, for example, wood plies, with appropriate reagents. For instance it may be spread as a dry powder upon a wood ply. It may be then softened with a number of reagents, even with water, a second wood ply superimposed, the whole put in a hot press and the glue permitted to set, after which a water resistant bond results. To increase the water resistance paraformaldehyde may be mixed with the dried, ground precipitate and the dry mixture spread on wood plies, softened with water, the plies laid together and pressed as above. The resulting plywood will be found to possess a very strong bond having a high degree of water resistance. Three-ply wood veneer bound with the adhesive of Example 2—B has been fully exposed to the elements for a period of more than six months during the fall, winter and spring, without separation of the plies or other evidence of deterioration. These new products in the dry form, as illustrated by the product of Example 2—B, are insoluble in water, alcohols, phenol and all common solvents. Under the influence of heat and pressure the product is softened by water. It is softened when heated with glycerine, diethylene glycol, furfural, urea and other agents. After being softened the product gels on addition of formaldehyde and its equivalents. The products are dissolved by ammonia but not by other alkalies. An analysis of one of these products in the dry form showed the zinc content to be approximately 9%.

Example 3.—To 50 parts of animal glue add 50 parts of water. Let stand 10 minutes. Add 50 parts solid zinc chloride. Heat of solution is sufficient to complete reaction. The mixture does not gel when cool as do water solutions of animal glue whether the animal glue is clarified or not. Two per cent. of paraformaldehyde may be added to this reaction mixture with a resulting life of at least six hours and a high degree of water resistance.

Example 3—A.—To 40 parts of Example 3 add 10 parts urea and 2 parts formalin. This mixture has a life of many months.

Example 4.—To 500 parts of ground casein are added approximately 800 parts of water. The material is permitted to soak for 10 or 15 minutes with some stirring. To the mass is then added 500 parts of solid zinc chloride and stirred continuously with the application of such external heat as is necessary to bring the mass to complete reaction. 450 parts of urea are then added and stirred in. This addition of urea causes a thinning to take place similar to the action which would be evident if the casein-zinc chloride compound was subjected to heat. After the mixture is complete 90 parts of formaldehyde are added and the mixture thoroughly agitated. The product of Example 4 has an extremely long working life, a matter of many months, and is eminently suited to bond wood to wood, cloth to wood, cloth to plaster, paper to metal, wood to metal, etc. Heating of the bond to a temperature between 100 and 200° F. for a short period produces a high degree of water resistance in all these instances. If it is desired to thin the product of Example 4 any of the above noted thinning agents may be used except water.

I have made the discovery that the proteinous substances may be so treated with zinc chloride to produce adhesive bases from which bases adhesives of extremely wide use may be obtained which adhesives can be made highly water resistant, low in cost and of extraordinarily long working life. It will be particularly noted that the absence of alkalies and the reaction products of alkalies results in a most desirable property of the product of my invention, namely the absolute lack of stain when the adhesives are used on wood, cloth, etc. It will further be particularly noted that these exemplified adhesives have exceptionally low water requirements thereby minimizing the addition of water to wood and other materials in the process of gluing, thus avoiding any redrying operation. It is also to be noted that other oil seed residue meals such as soya bean meal, cottonseed meal, linseed meal, etc. may be used. I have also used purified vegetable proteins as for example soya bean protein, and the protein of peanuts. All of the proteinous materials hereinbefore enumerated are suitable for use in my process, some of the resulting products being more suitable for some uses than others, but all of them being usable for all the purposes enumerated.

In cases where desired adhesive properties are best obtained from blends I have used also blends of proteinous substances in developing useful adhesives of excellent working properties, high water resistance and long life by applying the principle of my invention. Examples are mixtures of casein and blood, casein and peanut flour, peanut flour and animal glue.

I have found an adhesive comprising casein, blood, zinc chloride, hexalin, urea and formaldehyde with water has most excellent working properties, long life and high water resistance when used for gluing the materials hereinbefore noted.

In the case of blood for some unknown reason, probably due to some individual peculiarity of blood proteins, the dispersion is not as smooth if the zinc chloride is added directly to the blood, as it is if the blood is first treated with urea. The urea however does not itself disperse the blood but certainly does assist the zinc chloride to disperse it by its thinning action. This prevents the formation of refractory gelatinous masses. The result is that by having the urea present with the blood at the start the protein-zinc chloride reaction product is smooth and homogeneous while without it a lumpy, unsatisfactory product results. By my method a useful glue is produced with all the proteins which I have enumerated, however, in the case of blood it is desirable to act on the protein with urea before acting on it with zinc chloride. In the case of proteins other than blood including casein it is immaterial whether the urea or the zinc chloride is used first, but with blood it is preferable to use the urea first.

I have made the further discovery that the protein-zinc chloride reaction product may be obtained in the presence of alcohol instead of water. To illustrate I may cite as

*Example 5.*—To 500 parts of powdered casein are added 500 parts of fused zinc chloride dissolved in 1000 parts of 95% alcohol and stirring continued until the adhesive is smooth, then add 450 parts of urea and 90 parts of formaldehyde.

This formula results in a very excellent adhesive with fast drying properties resulting from the volatile medium.

When using the above exemplified adhesives containing formalin for the gluing of wood I have found it advantageous to heat the glued panels or wood pieces, thereby developing an even higher degree of water resistance. The term water resistance as used herein may be defined as that property of adhesives developed therein which permits articles bound with the adhesives to resist the separating action of water for periods of 24 hours to months even when the bonded articles are completely submerged in water.

While the causes of such colloidal phenomena as those exhibited by my discovery do not admit of positive explanation it appears probable the underlying principle may be the following: Adhesive bases have been developed comprising the reaction products of proteinous substances and zinc chloride, which adhesive bases are, to a varying degree according to conditions, insolubilized or rendered hydrophobic by water resistance producing agents, which agents, in turn, are buffered by thinning agents.

Other modes of applying the principle of the invention may be employed instead of the ones explained, change being made as regards the features herein disclosed, provided the features stated in any of the following claims, or the equivalent of such be employed.

I therefore particularly point out and distinctly claim as my invention:

1. An adhesive base comprising a proteinous substance converted by about an equal amount of zinc chloride in the presence of a liquid containing the grouping R—OH, in which R is hydrogen or an alkyl radicle.

2. An adhesive base comprising a proteinous substance converted by about an equal amount of zinc chloride in the presence of water.

3. An adhesive comprising a proteinous substance converted by about an equal amount of zinc chloride in the presence of alcohol.

4. An adhesive comprising vegetable protein-containing material converted by about an equal amount of zinc chloride in the presence of water.

5. An adhesive comprising vegetable protein-containing material converted by about an equal amount of zinc chloride in the presence of water together with a water resistance increasing agent.

6. An adhesive comprising vegetable protein containing material converted by about an equal amount of zinc chloride in the presence of water together with a thinning agent and a water resistance increasing agent.

7. An adhesive comprising vegetable protein-containing material converted by about an equal amount of zinc chloride in the presence of water together with formaldehyde.

8. An adhesive comprising vegetable protein-containing material converted by about an equal amount of zinc chloride in the presence of water together with urea and formaldehyde.

9. An adhesive comprising vegetable protein-containing material converted by about an equal amount of zinc chloride in the presence of water together with alcohol and formaldehyde.

10. An adhesive comprising peanut flour converted by about an equal amount of zinc chloride in the presence of water.

11. An adhesive comprising peanut flour converted by about an equal amount of zinc chloride in the presence of water together with a water resistance increasing agent.

12. An adhesive comprising peanut flour converted by about an equal amount of zinc chloride in the presence of water together with a thinning agent and a water resistance increasing agent.

13. An adhesive comprising peanut flour converted by about an equal amount of zinc chloride in the presence of water together with formaldehyde.

14. An adhesive comprising peanut flour converted by about an equal amount of zinc chloride in the presence of water together with urea and formaldehyde.

15. An adhesive base comprising animal protein-containing material converted by about an equal amount of zinc chloride in the presence of water.

16. An adhesive comprising animal protein-containing material converted by about an equal amount of zinc chloride in the presence of water together with a water resistance increasing agent.

17. An adhesive comprising animal protein-containing material converted by about an equal amount of zinc chloride in the presence of water together with a thinning agent and a water resistance increasing agent.

18. An adhesive base comprising casein converted by about an equal amount of zinc chloride in the presence of water.

19. An adhesive base comprising casein converted by about an equal amount of zinc chloride in the presence of alcohol.

20. An adhesive comprising casein converted by about an equal amount of zinc chloride in the presence of water together with formaldehyde.

21. An adhesive comprising casein converted by about an equal amount of zinc chloride in the presence of water together with methyl alcohol and formaldehyde.

22. An adhesive comprising a blend of proteinous substances converted by about an equal amount of zinc chloride in the presence of water together with formaldehyde.

23. An adhesive comprising a blend of proteinous substances converted by about an equal amount of zinc chloride in the presence of water together with urea and formaldehyde.

24. An adhesive comprising a proteinous substance converted by about an equal amount of zinc chloride in the presence of water together with hexalin, urea and formaldehyde.

25. The process of making adhesives which comprises acting upon a proteinous substance converted by about an equal amount of zinc chloride, with a water resistance producing agent buffered by a thinning agent.

26. The method of reacting upon blood albumen with zinc chloride comprising the steps of first mixing the blood albumen with urea in the presence of water, and then adding zinc chloride.

27. The process of producing a composition of matter which comprises precipitating by addition of excess water, a proteinous substance converted by about an equal amount of zinc chloride in the presence of water.

28. A composition of matter, comprising the reaction product of about equal amounts of zinc chloride and a compound of blood albumen and urea.

ALBERT HENRY BOWEN.